(12) United States Patent
  Eguchi

(10) Patent No.: US 9,876,448 B2
(45) Date of Patent: Jan. 23, 2018

(54) POSITION CONTROL APPARATUS

(71) Applicant: OKUMA Corporation, Niwa-gun, Aichi (JP)

(72) Inventor: Satoshi Eguchi, Aichi (JP)

(73) Assignee: OKUMA CORPORATION, Niwa-gun, Aichi (JP)

( * ) Notice: Subject to any disclaimer, the term of this patent is extended or adjusted under 35 U.S.C. 154(b) by 0 days.

(21) Appl. No.: 14/830,144

(22) Filed: Aug. 19, 2015

(65) Prior Publication Data

US 2016/0056736 A1 Feb. 25, 2016

(30) Foreign Application Priority Data

Aug. 20, 2014 (JP) ................. 2014-167255

(51) Int. Cl.
  G05B 11/32 (2006.01)
  H02P 5/50 (2016.01)
  G05B 19/19 (2006.01)

(52) U.S. Cl.
  CPC ............... H02P 5/50 (2013.01); G05B 19/19 (2013.01); *G05B 2219/50218* (2013.01)

(58) Field of Classification Search
  CPC ................. G05B 19/19; G05B 19/416; G05B 2219/40399; H02P 5/50
  USPC .................. 318/571, 625, 632, 638, 567
  See application file for complete search history.

(56) References Cited

U.S. PATENT DOCUMENTS

| 2,586,941 | A  | * | 2/1952 | Gretener ............... G05G 19/00 74/388 R |
| 7,656,106 | B2 | * | 2/2010 | Iwashita .............. G05B 19/195 318/39 |
| 2001/0028228 | A1 |  | 10/2001 | Toyozawa et al. |
| 2004/0168846 | A1 | * | 9/2004 | Maekawa .......... B60K 23/0808 180/248 |
| 2008/0218116 | A1 | * | 9/2008 | Maeda ................... G05B 19/19 318/571 |
| 2009/0167231 | A1 | * | 7/2009 | Sussmeier ............... H02P 5/695 318/610 |

FOREIGN PATENT DOCUMENTS

JP  3492583 B2  2/2004

* cited by examiner

*Primary Examiner* — Bentsu Ro
*Assistant Examiner* — Thai Dinh
(74) *Attorney, Agent, or Firm* — Cantor Colburn LLP

(57) ABSTRACT

A tandem control method is applied to a position control apparatus. The tandem control method controls one object to be controlled by individually driving a first driving shaft and a second driving shaft. A speed difference between the first driving shaft and the object to be controlled is amplified and added to a torque command value of the first driving shaft. A speed difference between the second driving shaft and the object to be controlled is amplified and added to a torque command value of the second driving shaft.

3 Claims, 13 Drawing Sheets

POSITION CONTROL APPARATUS

CROSS REFERENCE TO RELATED APPLICATIONS

The present invention claims priority under 35 U.S.C. §119 to Japanese Application No. 2014-167255 filed on Aug. 20, 2014, the entire content of which is incorporated herein by reference.

BACKGROUND

Technical Field

The present invention relates to a servo control apparatus that controls a shaft of, for example, a machine tool or an arm of a robot. More specifically, the invention relates to tandem control that controls one object to be controlled, by two motors.

Related Art

In a driving mechanism of, for example, a machine tool or a robot, when, for example one object to be controlled serving as a movable portion is large in size and torque (thrust in a linearly moving motor) of one motor is insufficient for driving a shaft of the movable portion, tandem control is applied. In tandem control, a command is given to two motors so that the two motors drive the one object to be controlled. In this case, each of the two motors (a rotary motor or a linear motor) drives the one object to be controlled in a rotating direction or a linearly moving direction via a gear and a coupling element.

FIG. 8 is a schematic view of a target plant to which the tandem control is applied, converted into a rotary motor shaft. Symbols I1 and I2 denote moments of inertia of a driving shaft 1 and another driving shaft 2, respectively. Each of the driving shafts includes one motor. Symbol IL denotes a moment of inertia of one object to be controlled. A first torque transmission system between the object to be controlled and the driving shaft 1 is denoted with a first spring system including rigidity K1 and viscous resistance D1. A second torque transmission system between the object to be controlled and the driving shaft 2 is denoted with a second spring system including rigidity K2 and viscous resistance D2. Note that x1, x2, and xL denote positions of the driving shaft 1, the driving shaft 2, and the object to be controlled, respectively.

FIG. 9 is a block diagram of an exemplary position control apparatus 300 in the related art. The position control apparatus 300 controls the position xL of the object to be controlled to which the tandem drive is applied, in accordance with a position command value X produced by function generation in each constant cycle from a host device (not shown). A first shaft position control unit 100a and a second shaft position control unit 100b control the driving shaft 1 and the driving shaft 2, respectively. Note that, in the following descriptions, elements having a common shaft are denoted with suffix a (first shaft) or b (second shaft) added to the assigned numeral. Operation of the position control apparatus 300 in the related art in FIG. 9 will be described below.

First, the first shaft position control unit 100a will be described. In the present conventional example, the first shaft position control unit 100a includes a feedforward configuration in order to speed up a command response. More specifically, an acceleration and deceleration processing unit 50a applies acceleration and deceleration processing having proper acceleration and jerk to the position command value X so as to output a position command value Xc to which the acceleration and deceleration processing has been applied. A differentiator 54a applies time differentiation to the position command value Xc so as to output a speed feedforward quantity VF. Furthermore, a differentiator 55a applies time differentiation to the speed feedforward quantity VF so as to output an acceleration command value AF. An amplification factor ATF of an amplifier ATF is a constant for obtaining, for a target plant 200 shown in FIG. 8, an acceleration and deceleration torque feedforward quantity τF corresponding to motor torque that generates acceleration AF.

A feedback configuration of the first shaft position control unit 100a is as follows. First, a subtractor 51a subtracts the position x1 of the driving shaft 1 detected by a position detector (not shown), as position feedback, from the position command value Xc. A position error amplifier Kp amplifies a position error that is output of the subtractor 51a. An adder 52a adds output of the position error amplifier Kp to the speed feedforward quantity VF so as to output a speed command value V1. A subtractor 53a subtracts, from the speed command value V1, a speed v1 in which the position x1 is differentiated by a differentiator 56a. A speed error amplifier Gv typically applies proportional integral amplification to a speed error that is output from the subtractor 53a.

An adder 57a adds output of the speed error amplifier Gv and the acceleration and deceleration torque feedforward quantity τF so as to output a torque command value τ1 that is output from the first shaft position control unit 100a. Torque control (not shown) is applied to the torque command value τ1 so that the torque command value τ1 is substantially equal to motor-generated torque. This motor-generated torque is to be input torque to be added to the side of the driving shaft 1 of the target plant 200 shown in FIG. 8.

Since the second shaft position control unit 100b has substantially the same internal structure and constituent elements as the first shaft position control unit 100a, the descriptions are omitted. A torque command value τ2 that is output from the second shaft position control unit 100b is to be input torque to be added to the side of the driving shaft 2 of the target plant 200 shown in FIG. 8. In particular, when a torque transmission system between the driving shaft 1 and the driving shaft 2 and the torque transmission system between the driving shafts and the object to be controlled include members of the same specifications, the driving systems of the driving shaft 1 and the driving shaft 2 are in equilibrium. Therefore, the first shaft position control unit 100a and the second shaft position control unit 100b can have substantially the same configuration, including set values of the position error amplifier Kp, the speed error amplifier Gv, and the amplifier ATF.

Tandem control performance of the position control apparatus 300 in the related art shown in FIG. 9 will be described below. Note that target plant conditions include I1=I2=0.1 [kg·m2], IL=0.3 [kg·m2], K1=K2=50·103 [Nm/rad], D1=D2=0 [Nm/(rad/s)] selected, and preferred control conditions (Kp, Gv, ATF) for this target plant are set so that the two driving systems are in equilibrium.

FIGS. 10 and 11 are results of disturbance responses simulated by stepwise addition of a load disturbance τdis to the object IL to be controlled in FIG. 8, in order to evaluate disturbance inhibiting performance. Symbols v1, v2, and vL denote speeds of the driving shaft 1, the driving shaft 2, and the object to be controlled, respectively. Symbols a1, a2, and aL denote acceleration of the driving shaft 1, the driving shaft 2, and the object to be controlled, respectively. Symbols Diff1 (=Xc−x1), Diff2 (=Xc−x2), DiffL (=Xc−xL) denote position deviations of the driving shaft 1, the driving shaft 2, and the object to be controlled, respectively. In this case, as clearly shown in FIG. 11, a large vibration phenomenon attributed to the spring systems can be seen in the acceleration (a1, a2, aL) in a convergence process.

Next, FIG. 12 shows results obtained by simulating responses to a quadratic-function-type acceleration command value, in order to evaluate command tracking performance. As in the disturbance response, occurrence of vibration can be seen in the acceleration (a1, a2, aL) in an acceleration process. The position x1 of the driving shaft 1 and the position x2 of the driving shaft 2 are employed as the position feedback in the position control apparatus 300 in the related art shown in FIG. 9. Therefore, in the acceleration process, on the sides of the driving shafts, tracking is achieved to the position command value. However, on the side of the object to be controlled, a tracking delay is large and a large position deviation DiffL occurs.

FIG. 13 is a diagram of another exemplary configuration of the position control apparatus in the related art used in the tandem drive. There is added, to FIG. 9, a configuration that detects a speed difference between the driving shaft 1 and the driving shaft 2 and compensates torque command values so as to reduce deflection that occurs between the driving shaft 1 and the driving shaft 2. Parts different from FIG. 9 will be described below.

A subtractor 58 subtracts the speed v2 of the driving shaft 2 from the speed v1 of the driving shaft 1 so as to output a speed difference. The speed difference is amplified by an amplifier Gd and then subtracted, by a subtractor 59, from the torque command value that is output from the first shaft position control unit 100*a* so as to be the torque command value τ1 for the driving shaft 1 of a position control apparatus 301. Meanwhile, output of the amplifier Gd is added to the torque command value that is output from the second shaft position control unit 100*b* by an adder 60 so as to be the torque command value τ2 for the driving shaft 2 of the position control apparatus 301. With this configuration, the torque command values are compensated so as to reduce occurrence of the deflection.

FIG. 14 shows results of disturbance responses simulated by stepwise addition of the load disturbance τdis to the object IL to be controlled in FIG. 8 as in FIG. 11. When the results in FIG. 14 are compared with the results in FIG. 11, it can be seen that there is little difference in a vibration characteristic and no damping effect occurs. The configuration of the position control apparatus 301 in the related art shown in FIG. 13 is believed to be effective for inhibiting vibration attributed to torque interference between the driving shaft 1 and the driving shaft 2. However, like the present target plant, when torque is transmitted between each of the driving shafts and the object to be controlled via the spring system, although a compensation value is constituted by the speed difference between the driving shafts, vibration cannot be inhibited by reducing deflection in the target plant.

PRIOR ART DOCUMENT

Patent Document

Patent Document 1: JP 3492583 B

In a configuration in which a target plant to which the tandem control is applied drives an object to be controlled by each of two driving shafts via respective spring systems (torque transmission systems), when a load disturbance is applied to the object to be controlled, vibration easily occurs. For this type of the object to be controlled, although the tandem drive is applied to both ends of the object to be controlled by the two driving shafts, deflection between the object to be controlled and each of the driving shafts occurs upon acceleration and deceleration operation. Therefore, the object to be controlled cannot track in accordance with a position command value.

An object of the present invention is to provide a position control apparatus suitable to tandem drive. The position control apparatus reduces occurrence of vibration and, upon acceleration and deceleration operation, enables an object to be controlled to track in accordance with a position command value, for a target plant having a configuration in which each of two driving shafts drives the object to be controlled via a spring system.

SUMMARY

In a target plant including an internal spring system, adding a viscous resistance system increases a damping characteristic so as to reduce a vibration characteristic. According to an embodiment of the present invention, a position detector or a speed detector is disposed in the object to be controlled. Thus, the position detector or the speed detector can detect a speed difference (hereinafter referred to as a deflection speed) between each of the driving shafts and the object to be controlled. Then, the speed difference is amplified so as to calculate a torque compensation value. After that, the torque compensation value is added to a torque command value of each of the driving shafts so as to reduce the occurrence of the vibration.

Meanwhile, upon the acceleration and deceleration operation, an estimate calculation is performed to obtain a position difference (hereinafter referred to as a deflection quantity), a deflection speed, and viscous friction torque caused between each of the driving shafts and the object to be controlled. Then, the calculated results are added to a position command value, a speed command value, and a torque command value of each of the driving shafts so that the object to be controlled tracks in accordance with the position command value.

A position control apparatus according to an embodiment of the present invention can inhibit occurrence of vibration attributed to a load disturbance to be added to the object to be controlled. Meanwhile, upon the acceleration and deceleration operation, a deviation quantity between the position command value and a position of the object to be controlled can be reduced with vibration inhibition. As a result, highly precise position control in the tandem control can be achieved.

BRIEF DESCRIPTION OF DRAWINGS

Preferred embodiments of the present invention will be described in detail with reference to the following figures, wherein.

DETAILED DESCRIPTION

Figure 1:
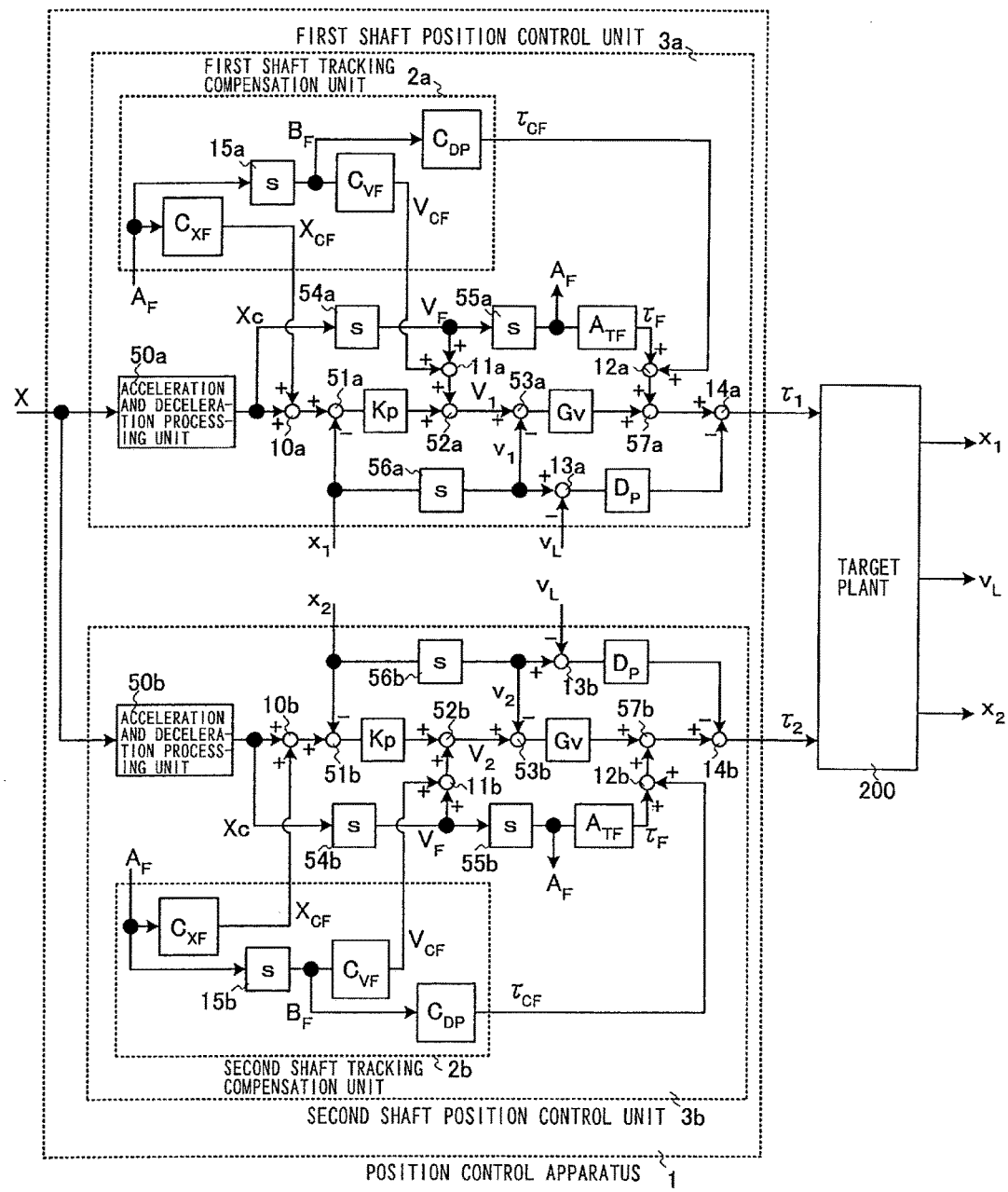
FIG. 1 is a block diagram of an exemplary configuration of a position control apparatus according to an embodiment of the present invention.

Preferred embodiments for carrying out the present invention will be described with reference to examples (hereinafter referred to as embodiments) below. FIG. 1 is a block diagram of an exemplary position control apparatus according to an embodiment of the present invention. Parts different from the conventional embodiments that have been described above will be described below. In the present embodiment, a speed detector (not shown) is disposed in an object to be controlled of a target plant 200.

A configuration and operation of a first shaft position control unit 3a will be described herein. Since a second shaft position control unit 3b has an internal configuration and constituent elements similar to those of the first shaft position control unit 3a, the descriptions are omitted. A subtractor 13a subtracts, from a speed v1 of a driving shaft 1, a speed vL of the object to be controlled detected by the speed detector so as to output a deflection speed on the side of the driving shaft 1. An amplifier Dp applies proportional integral amplification to the deflection speed on the side of the driving shaft 1 so as to produce output.

The output of the amplifier Dp is to be a torque compensation value. A subtractor 14a subtracts, from output of an adder 57a, the output of the amplifier Dp so as to output a torque command value τ1 of the first shaft position control unit 3a. Here, a characteristic of a torque transmission system between the object to be controlled and the driving shaft 1 can be approximated by the torque compensation value calculated from the deflection speed on the side of the driving shaft 1.

Figure 2:
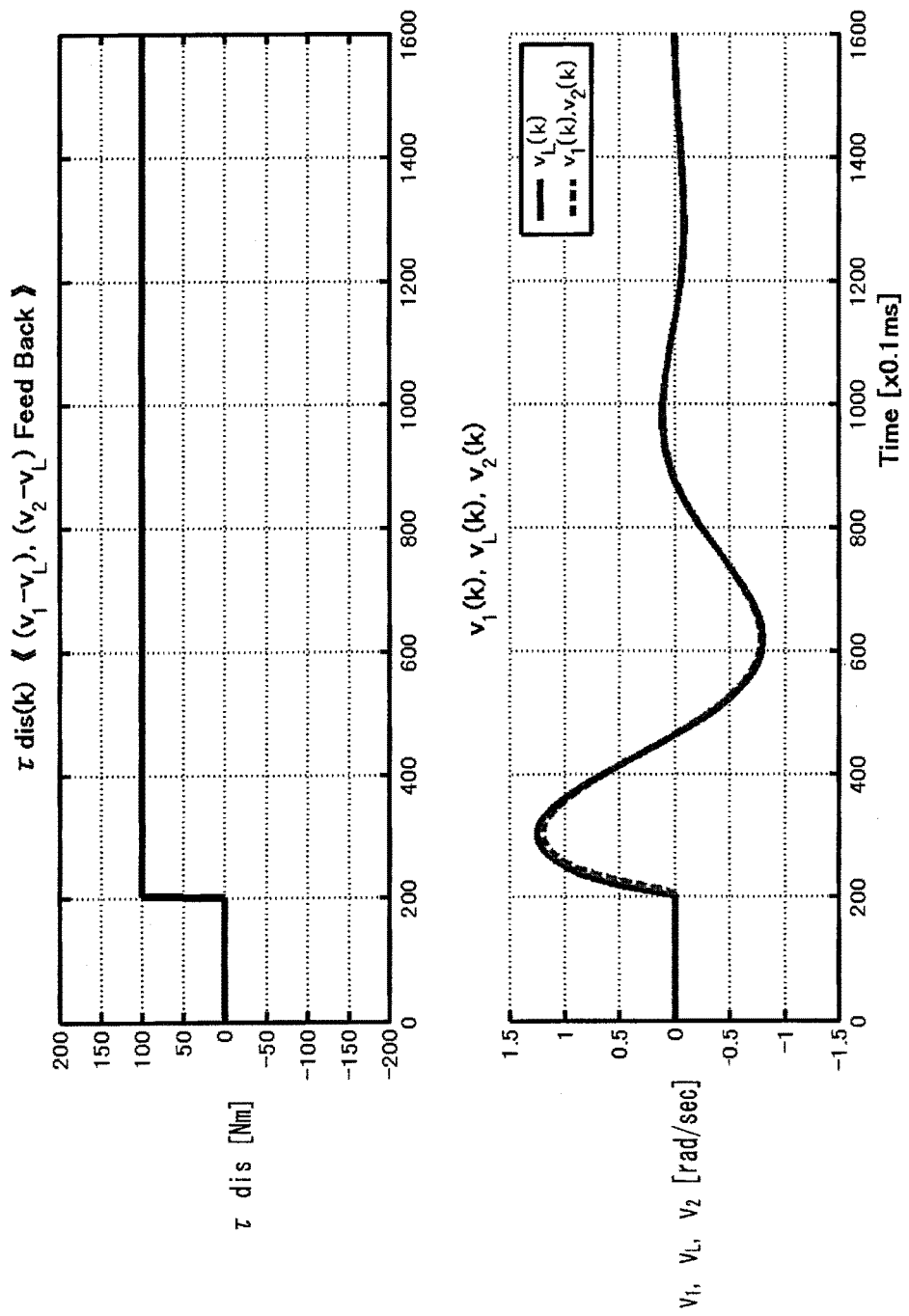
FIG. 2 shows graphs of parts of disturbance response simulation waveforms in the position control apparatus according to the embodiment of the present invention.
Figure 3:
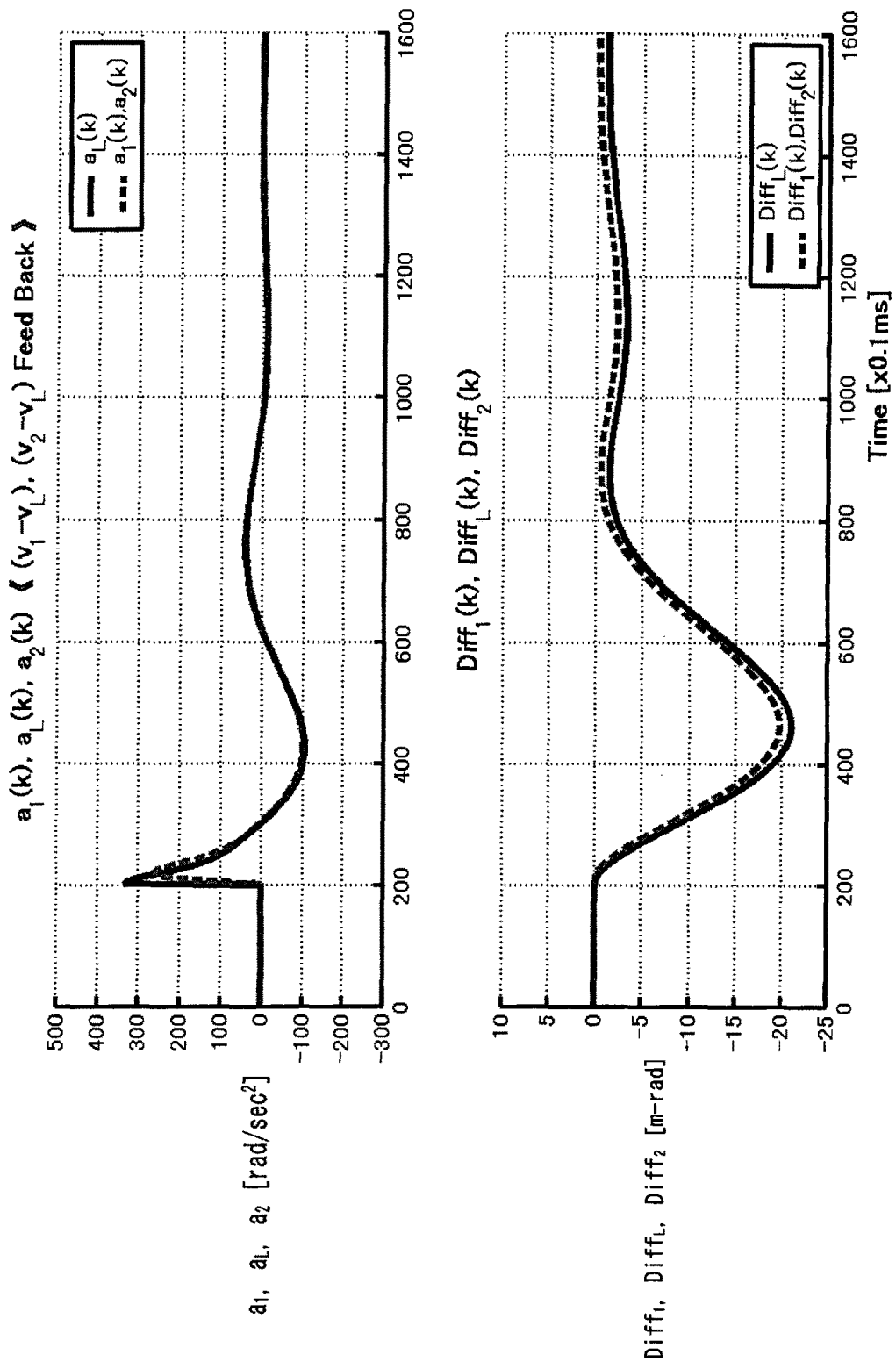
FIG. 3 shows graphs of other parts of the disturbance response simulation waveforms in the position control apparatus according to the embodiment of the present invention.
Figure 10:
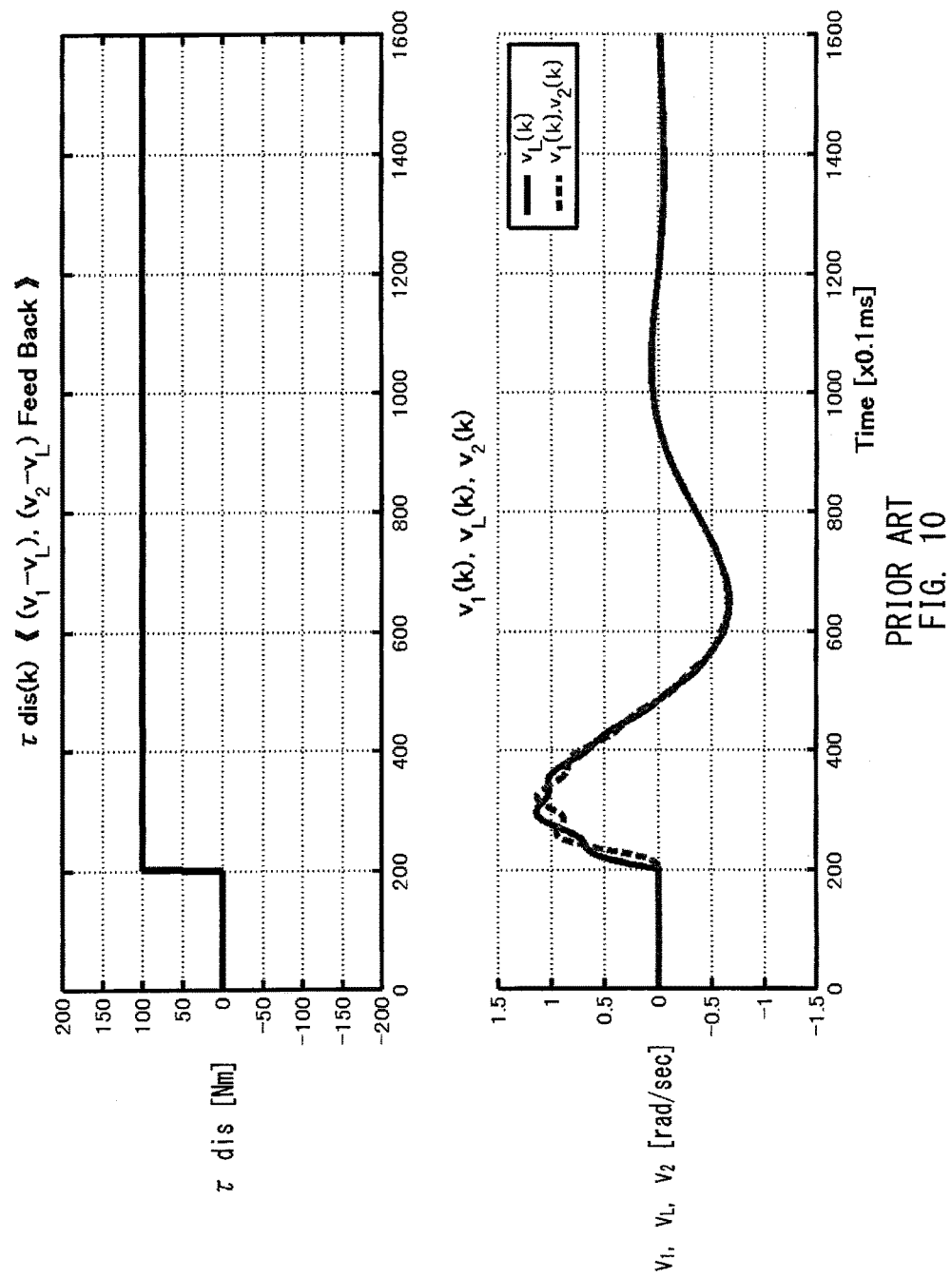
FIG. 10 shows graphs of parts of disturbance response simulation waveforms of the position control apparatus in the related art.
Figure 11:
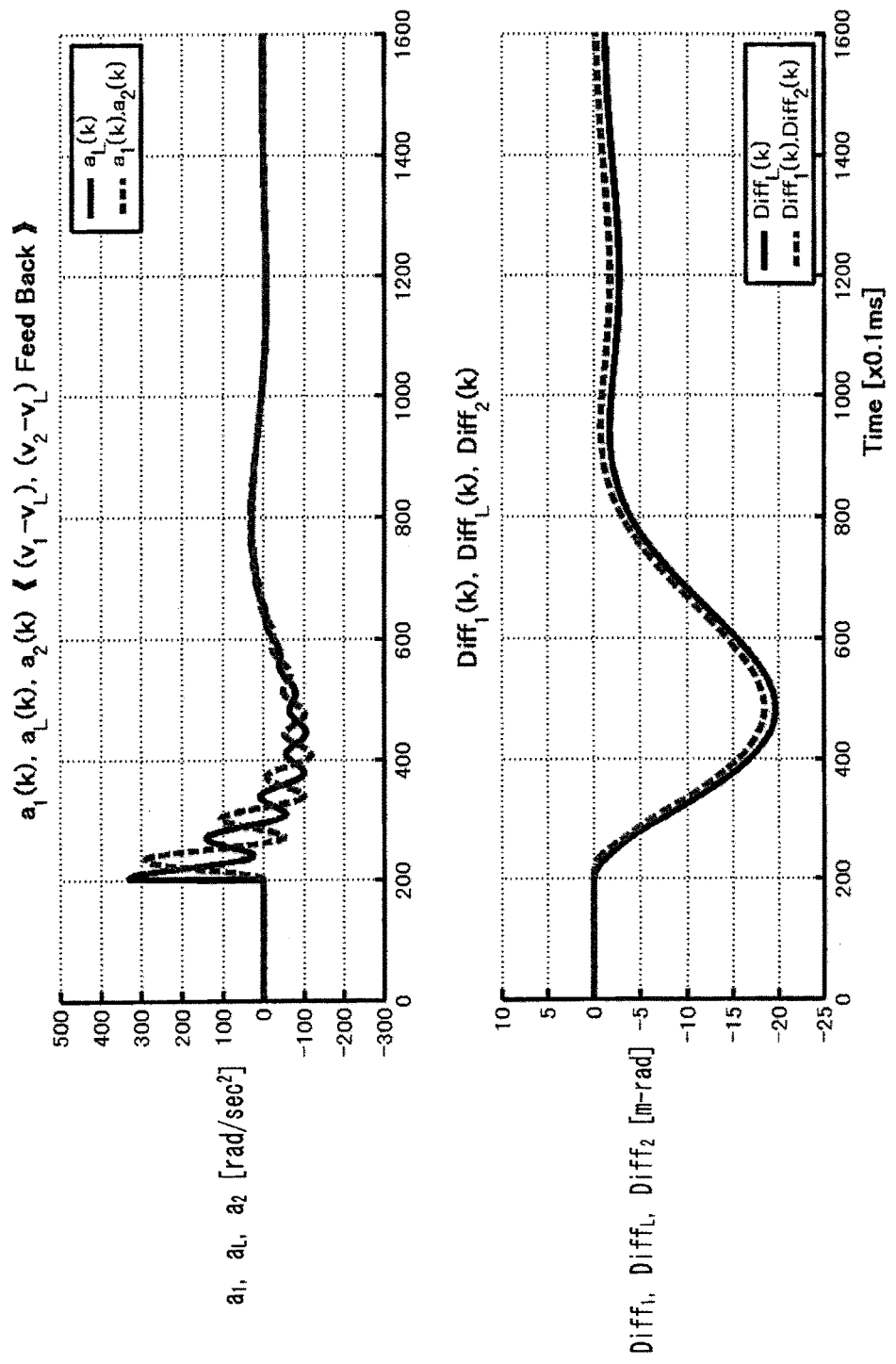
FIG. 11 shows graphs of other parts of disturbance response simulation waveforms of the position control apparatus in the related art.

A disturbance response in a position control apparatus 1 according to an embodiment of the present invention will be described. Here, an amplification factor of the amplifier Dp is set to be 100 (a constant). FIGS. 2 and 3 respectively correspond to FIGS. 10 and 11 of disturbance response simulation results of a position control apparatus 300 in the related art. FIGS. 2 and 3 are graphs of response simulations when a step-shaped load disturbance τdis is added to the object to be controlled. As shown in FIG. 3, even when position deviations (Diff1, Diff2, DiffL) occur by the step-shaped load disturbance, occurrence of vibration is inhibited in acceleration (a1, a2, aL).

Next, referring back to FIG. 1, operation of a first shaft tracking compensation unit 2a will be described. Upon acceleration and deceleration operation, the first shaft tracking compensation unit 2a serves as a compensation value calculation unit for causing a position xL of the object to be controlled to track, with high precision, a position command value Xc to which acceleration and deceleration processing has been applied. An amplifier CXF performs an estimate calculation, with an acceleration command value AF, to obtain a deviation quantity (hereinafter referred to as "a deflection quantity on the side of the driving shaft 1") between a position x1 of the driving shaft 1 and the position xL of the object to be controlled, upon the acceleration and deceleration operation.

An amplification factor CXF is defined by equation (1).

$$CXF=(IL/K1) \cdot gX \text{ (where } gX: 0.2 \text{ to } 0.8) \quad (1)$$

An adder 10a adds output XCF of the amplifier CXF to the position command value Xc to which the acceleration and deceleration processing has been applied so as to output a position command value (Xc+XCF) on position control. A subtractor 51a subtracts the position x1 of the driving shaft 1 from the position command value on the position control so as to output a position error.

A differentiator 15a differentiates the acceleration command value AF so as to output a jerk command value BF. An amplifier CVF performs an estimate calculation with the jerk command value BF to obtain a deviation quantity (a deflection speed on the side of the driving shaft 1) between the speed v1 of the driving shaft 1 and the speed vL of the object to be controlled upon the acceleration and deceleration operation. An amplification factor CVF is defined by equation (2).

$$CVF=(IL/K1) \cdot gV \text{ (where } gV: 0.2 \text{ to } 0.8) \quad (2)$$

An adder 11a adds output VCF of the amplifier CVF to a speed feedforward quantity VF and then an adder 52a adds output of the adder 11a to output of a position error amplifier Kp so that a speed command value V1 is calculated.

An amplifier CDP performs an estimate calculation with the jerk command value BF to obtain viscous friction torque upon the acceleration and deceleration operation. An amplification factor CDP is defined by equation (3).

$$CDP=(IL/K1) \cdot Dp \cdot gD \text{ (where } gD: 0.2 \text{ to } 0.8) \quad (3)$$

An adder 12a adds output tCF of the amplifier CDP to an acceleration and deceleration torque feedforward quantity IF. Then, the adder 57a adds output of the adder 12a to output of a speed error amplifier Gv.

Figure 4:
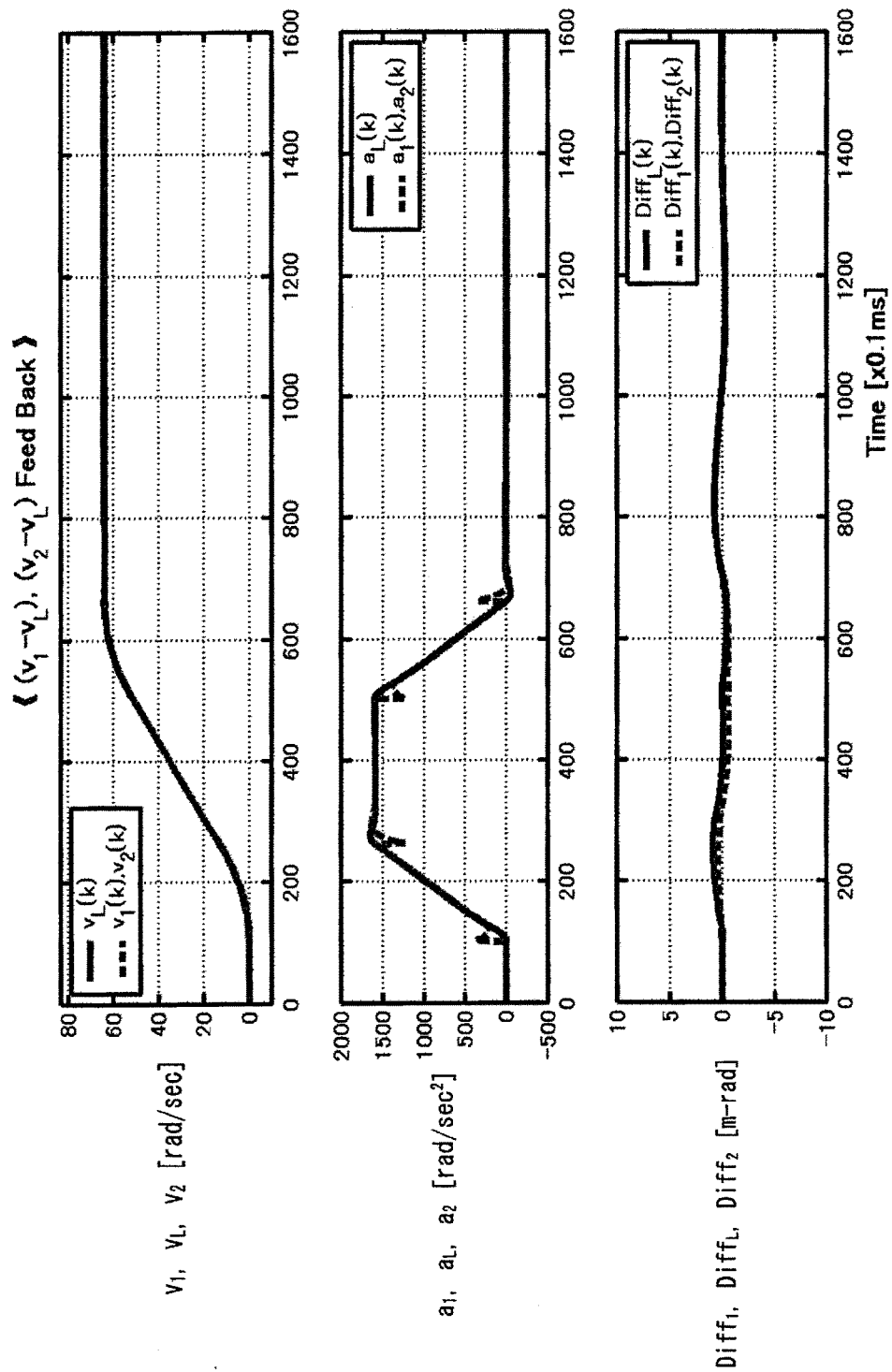
FIG. 4 shows graphs of response simulation waveforms to a quadratic-function-type acceleration command value in the position control apparatus according to the embodiment of the present invention.
Figure 12:
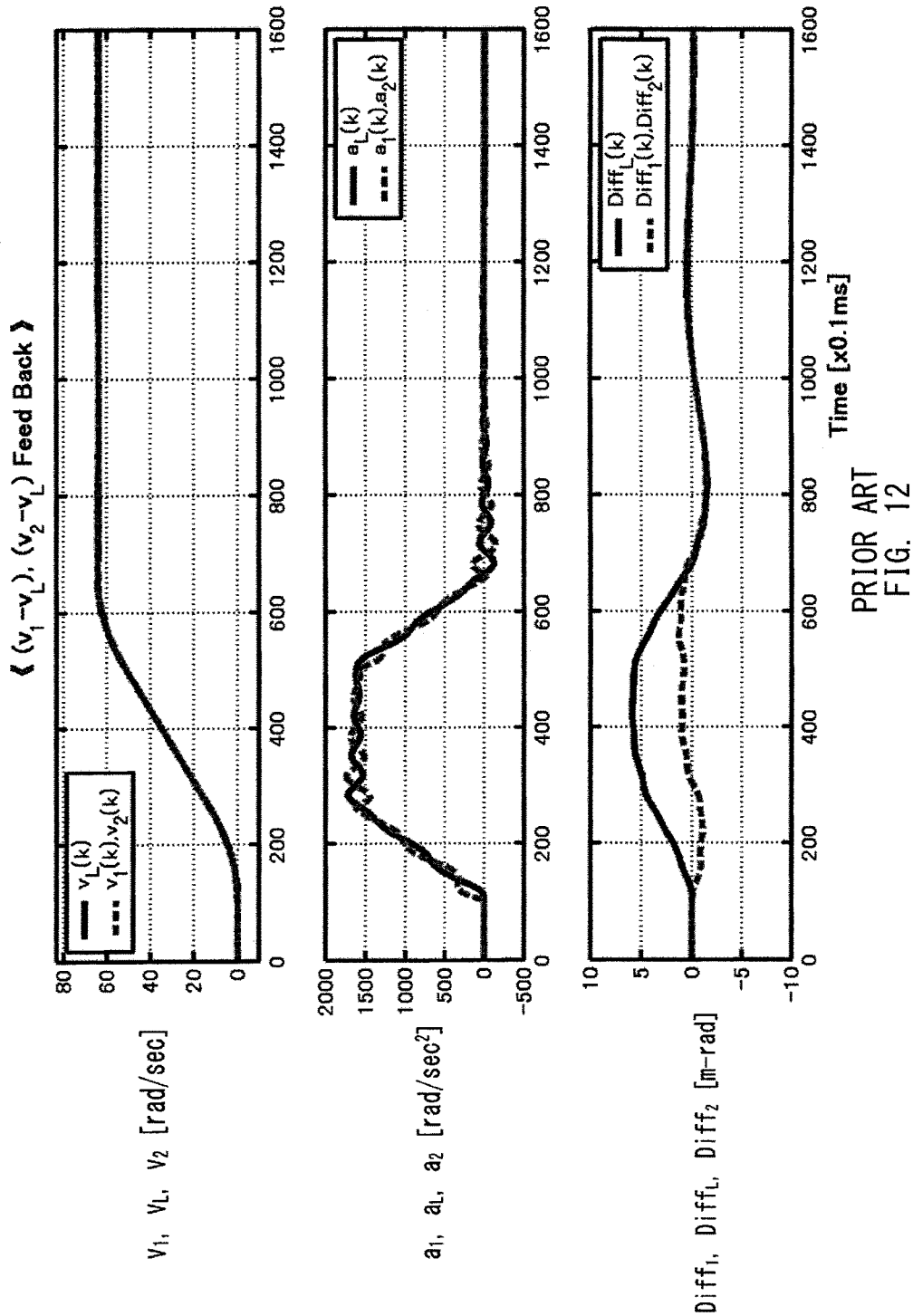
FIG. 12 shows graphs of response simulation waveforms to a quadratic-function-type acceleration command value of the position control apparatus in the related art.
Figure 13:
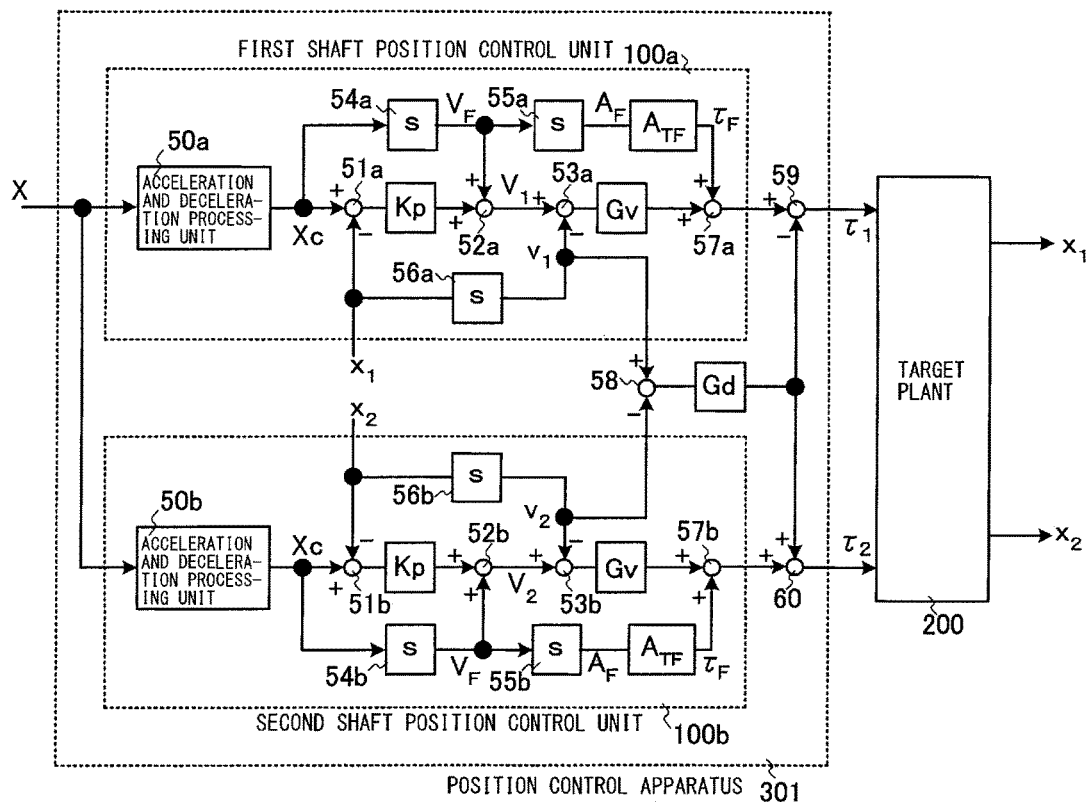
FIG. 13 is a block diagram of another exemplary configuration of the position control apparatus in the related art.
Figure 14:
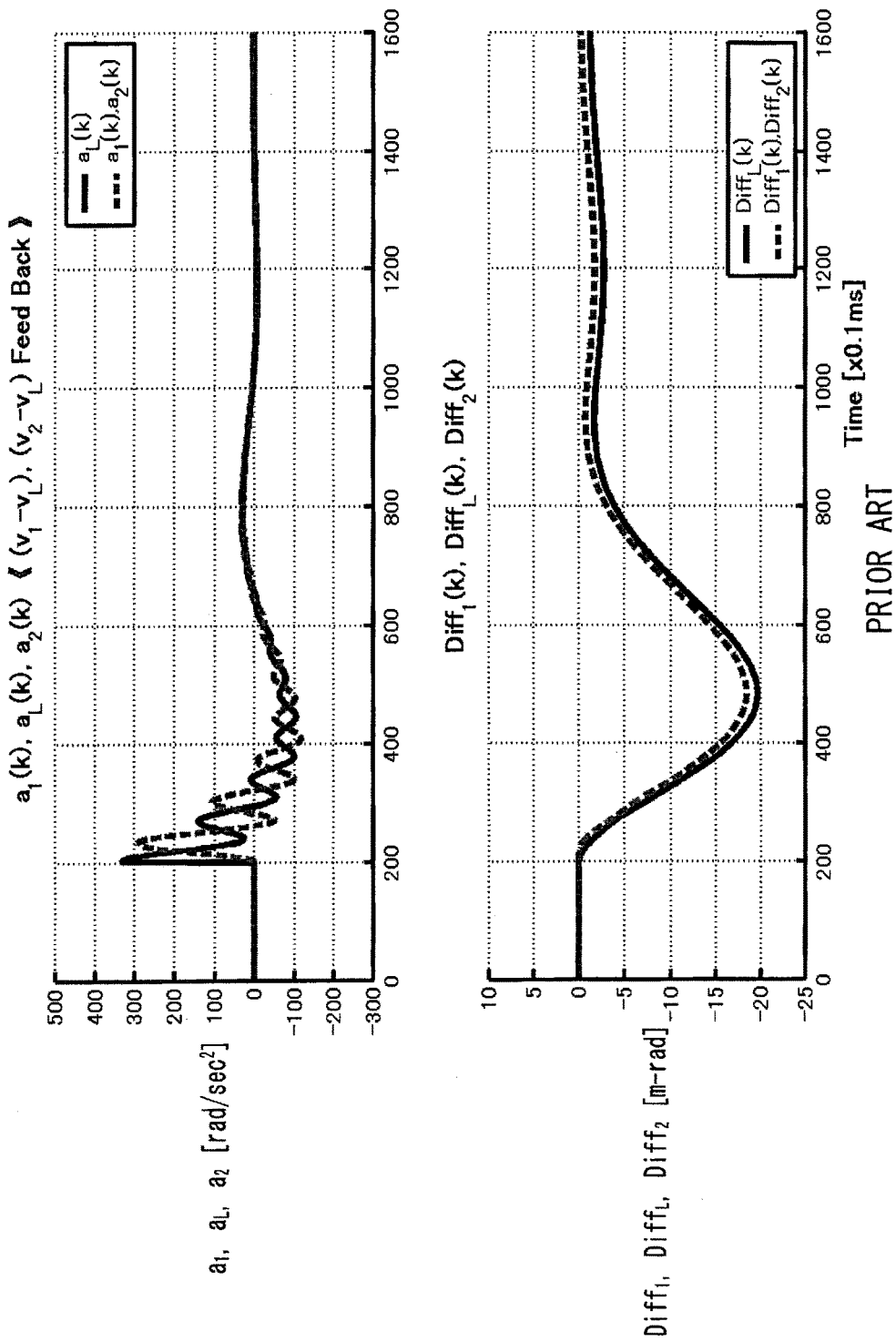
FIG. 14 shows graphs of parts of disturbance response simulation waveforms of another exemplary configuration of the position control apparatus in the related art.

Command tracking performance of the position control apparatus 1 according to an embodiment of the present invention will be described. Here, coefficients of the above amplifiers inside the first shaft tracking compensation unit 2a are as follows: (gX, gV, gD)=(0.45, 0.45, 0.5) FIG. 4 shows graphs of response simulation results for a quadraticfunction-type acceleration command value. The results in FIG. 4 correspond to response simulation results of the position control apparatus 300 in the related art in FIG. 12.

As can be seen in FIG. 4, in an acceleration process, vibration of acceleration aL of the object to be controlled is inhibited with an addition of the above tracking compensation values XCF, VCF, and tCF. Furthermore, controlling the position deviation Diff1 (=Xc+XCF−x1) between the position command value (Xc+XCF) on the position control and the position x1 of the driving shaft 1, and the position deviation Diff2 (=Xc+XCF−x2) between the position command value (Xc+XCF) on the position control and a position x2 of a driving shaft 2, as position errors, significantly improves a tracking delay of the object to be controlled to the position command value. Therefore, an occurrence of the position deviation DiffL (=Xc−xL) in the acceleration process can be significantly reduced.

Figure 5:
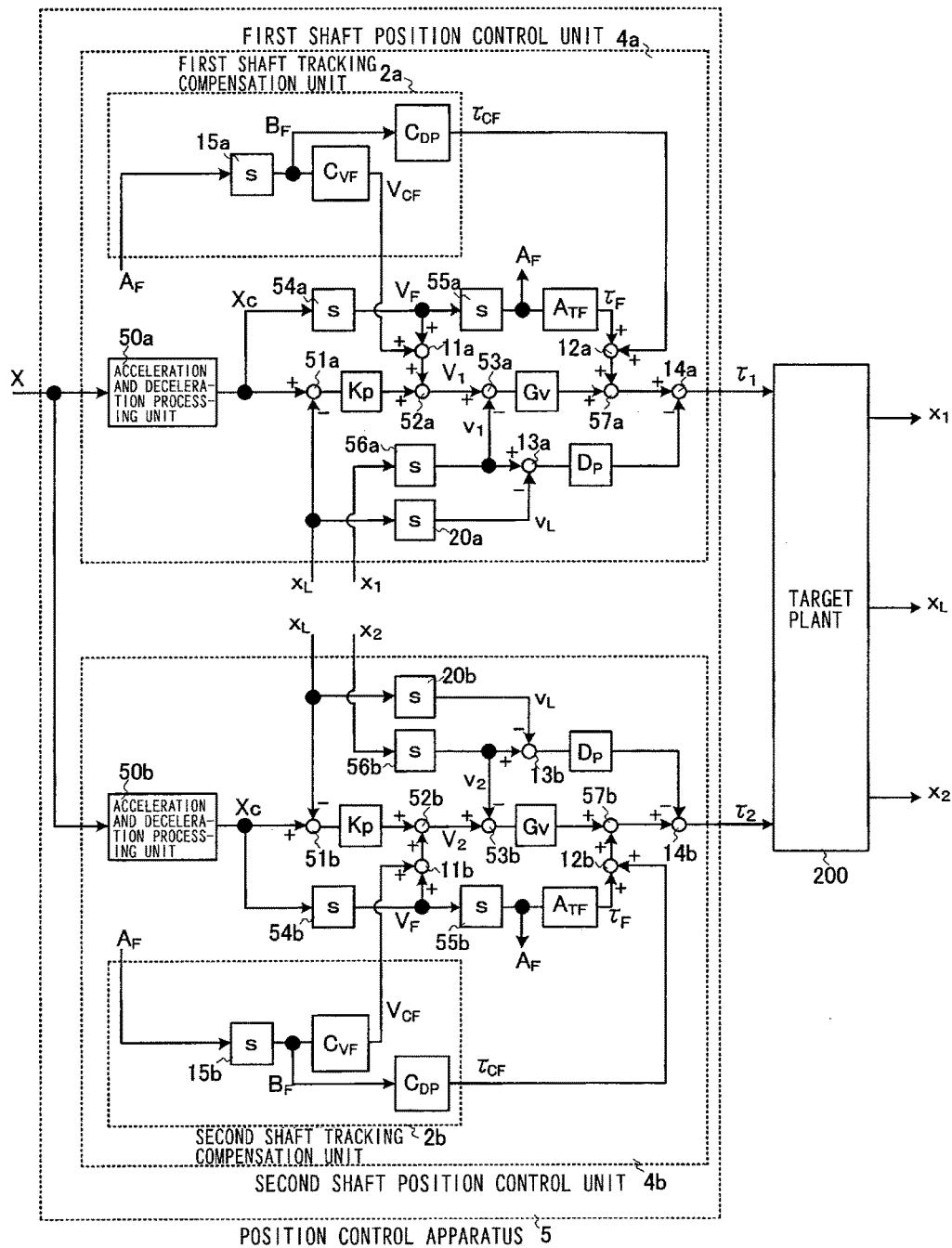
FIG. 5 is a block diagram of another exemplary configuration of a position control apparatus according to an embodiment of the present invention.

FIG. 5 is a block diagram of another exemplary position control apparatus according to an embodiment of the present invention. Parts that have not been described previously will be described below. In the present embodiment, a position detector (not shown) is disposed in the object to be controlled of the target plant 200. Since the position xL of the object to be controlled can be detected, both a first shaft position control unit 4a and a second shaft position control unit 4b constitute position feedback at the position xL of the object to be controlled.

Accordingly, the position command value on the position control includes the position command value Xc to which acceleration and deceleration processing has been applied. Thus, the output XCF of the amplifier CXF in the first shaft tracking compensation unit 2a is not required. On the other hand, a differentiator 20a differentiates the position xL of the object to be controlled so as to calculate the speed vL of the object to be controlled. Like the embodiment of the present invention in FIG. 1, the speed vL of the object to be controlled is used for calculating the deflection speed on the side of the driving shaft 1.

Figure 6:
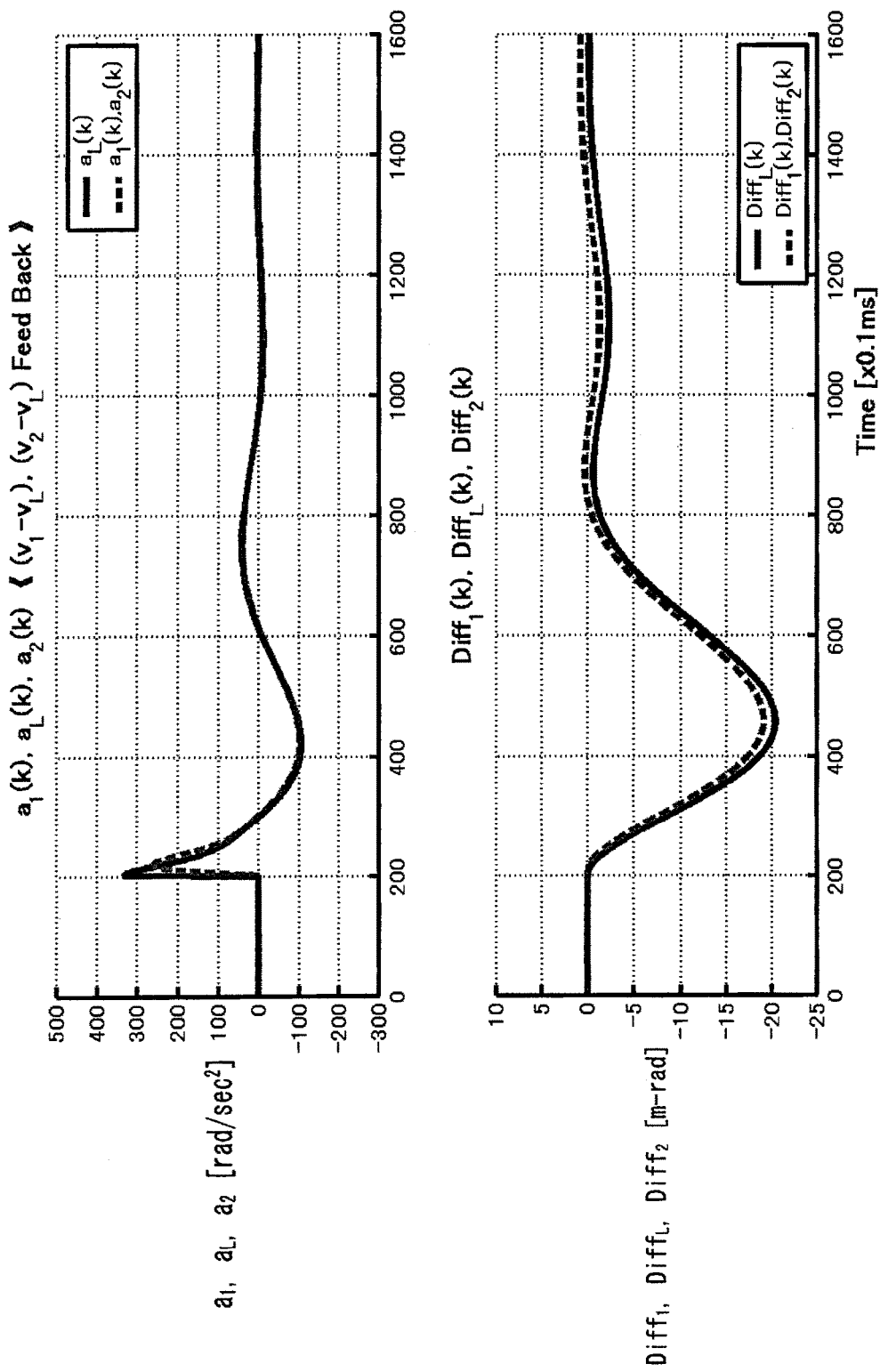
FIG. 6 shows graphs of parts of disturbance response simulation waveforms of another exemplary configuration of the position control apparatus according to the embodiment of the present invention.

FIG. 6 shows graphs of response simulations when the step-shaped load disturbance τdis is added to the object to be controlled in a position control apparatus 5 according to an embodiment of the present invention. Occurrence of vibration is inhibited in the acceleration (a1, a2, aL) as in FIG. 3 to which the position control apparatus 1 is applied. On the other hand, in the present embodiment, since the position feedback includes the position xL of the object to be controlled, the position deviation DiffL (=Xc−xL) of the object to be controlled is regularly set to zero.

Figure 7:
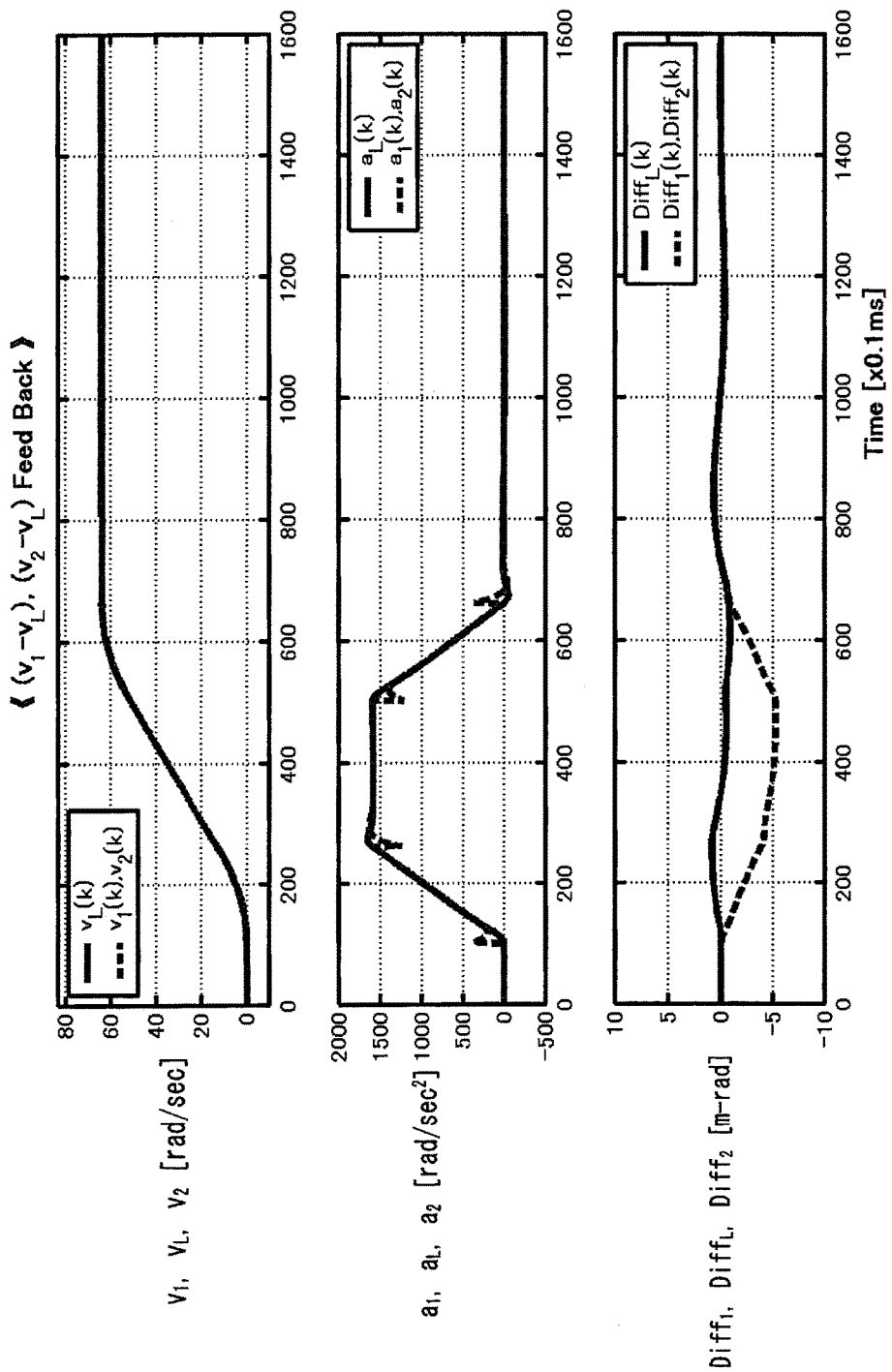
FIG. 7 shows graphs of response simulation waveforms to a quadratic-function-type acceleration command value of another exemplary configuration of the position control apparatus according to the embodiment of the present invention.
Figure 8:
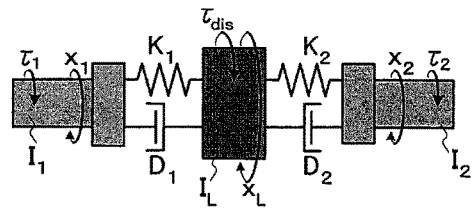
FIG. 8 is a schematic diagram of a target plant to which tandem control is applied.
Figure 9:
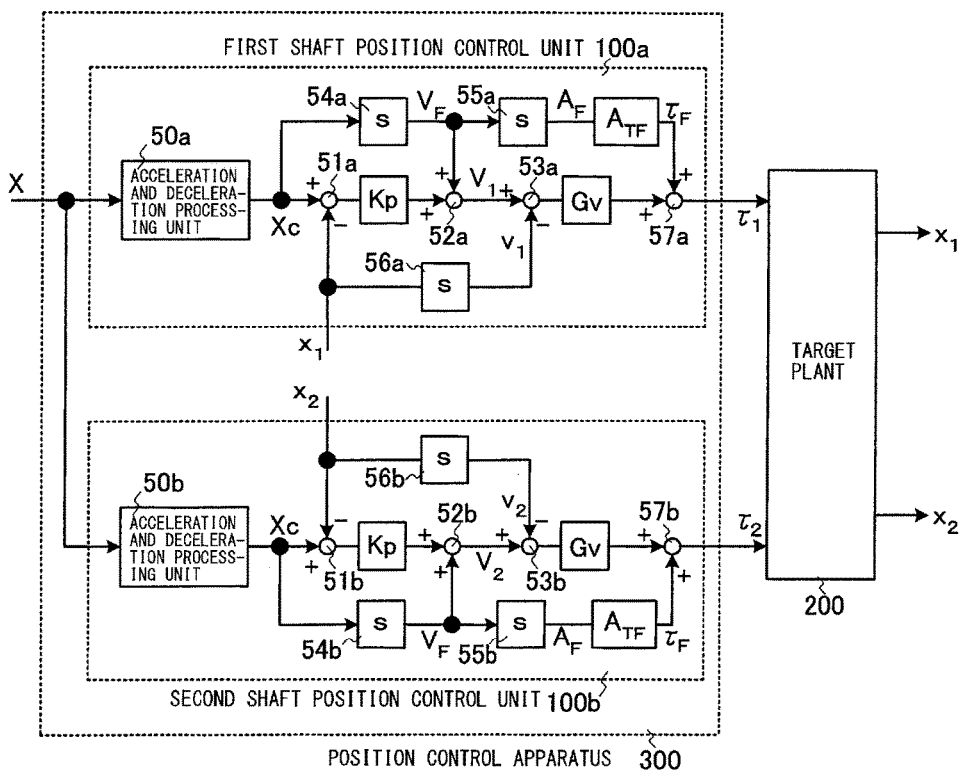
FIG. 9 is a block diagram of an exemplary configuration of a position control apparatus in the related art.

FIG. 7 shows graphs of response simulations for the quadratic-function-type acceleration command value. As can be seen in FIG. 7, adding the tracking compensation values VCF and tCF inhibits vibration of the acceleration aL of the object to be controlled in the acceleration process as in FIG. 4 to which the position control apparatus 1 is applied. In the present embodiment, the position feedback includes the position xL of the object to be controlled. Therefore, the position deviation DiffL (=Xc−xL) of the object to be controlled can be inhibited. However, the position x1 of the driving shaft 1 and the position x2 of the driving shaft 2 are not objects to which the position control is directly applied. Therefore, the deflection quantity on the side of the driving shaft 1 and the deflection quantity on the side of the driving shaft 2 occur as the position deviation Diff1 (=Xc−x1) and the position deviation Diff2 (=Xc−x2), respectively.

As a premise, there has been described the target plant that includes the torque transmission systems between the driving shaft 1 and the driving shaft 2, and between the driving shafts and the object to be controlled, having members of the same specification. The target plant also includes the two driving systems in balance. However, even when the driving systems are unbalanced, the amplifiers (Dp, CXF, CVF, CDP) included in the first (or the second) shaft position control unit are individually set for each shaft in accordance with the torque transmission system between the driving shaft 1 (or the driving shaft 2) and the object to be controlled. As a result, a damping characteristic of each of the torque transmission systems can be controlled so as to be substantially the same. In addition, tracking compensation control can be achieved in accordance with the deflection that occurs in each of the driving shafts upon the acceleration and deceleration operation.

As described above, a position control apparatus according to an embodiment of the present invention is capable of inhibiting a vibration phenomenon even when the two driving systems are unbalanced. Furthermore, tracking performance can be improved upon acceleration and deceleration operation, and position control with high precision in tandem control can be achieved. Note that when a speed difference between each of driving shafts and an object to be controlled is amplified and added to a torque command value of the respective driving shaft, the first shaft tracking compensation unit 2a and the second shaft tracking compensation unit 2b may be omitted.

What is claimed is:

1. A position control apparatus to which a tandem control method is applied, the tandem control method including controlling one object to be controlled by individually driving a first driving shaft and a second driving shaft, the position control apparatus comprising:
a first shaft position control unit which includes:
a first subtractor which subtracts, from a speed of the first driving shaft, a speed of the object to be controlled detected;
an amplifier which amplifies a speed difference between the first driving shaft and the object to be controlled to produce output; and
a second subtractor, which subtracts, from a torque command value of the first driving shaft, the output of the amplifier, to output a torque command value of the first driving shaft, and
a second shaft position control unit which includes:
a first subtractor which subtracts, from a speed of the second driving shaft, a speed of the object to be controlled detected;
an amplifier which amplifies a speed difference between the second driving shaft and the object to be controlled to produce output; and
a second subtractor, which subtracts, from a torque command value of the second driving shaft, the output of the amplifier to output a torque command value of the second driving shaft.

2. The position control apparatus according to claim 1,
wherein the position control apparatus controls each of positions of the first driving shaft and the second driving shaft by semi-closed position control that uses the position of each of the driving shafts as a feedback value,
the position control apparatus performs an estimate calculation obtain a position difference, the speed difference, and viscous friction that occur between the first driving shaft and the object to be controlled, and adds the obtained position difference, the obtained speed difference, and the obtained viscous friction to a position command value of the first driving shaft, a speed command value of the first driving shaft, and the torque command value of the first driving shaft, respectively, and the position control apparatus performs an estimate calculation to obtain a position difference, the speed difference, and viscous friction that occur between the second driving shaft and the object to be controlled, and adds the obtained position difference, the obtained speed difference, and the obtained viscous friction to a position command value of the second driving shaft, a speed command value of the second driving shaft, and the torque command value of the second driving shaft, respectively.

3. The position control apparatus according to claim 1, wherein each of the positions of the first driving shaft and the second driving shaft is controlled by full-closed position control that uses a position of the one object to be controlled as a feedback value, an estimate calculation is performed to obtain the speed difference and viscous friction that occur between the first driving shaft and the object to be controlled, and the obtained speed difference and the obtained viscous friction are added to a speed command value of the first driving shaft and the torque command value of the first driving shaft, respectively, and an estimate calculation is performed to obtain the speed difference and viscous friction that occur between the second driving shaft and the object to be controlled, and the obtained speed difference and the obtained viscous friction are added to a speed command value of the second driving shaft and the torque command value of the second driving shaft, respectively.

* * * * *